United States Patent [19]

Finkelstein et al.

[11] Patent Number: 5,606,541

[45] Date of Patent: Feb. 25, 1997

[54] SWITCHABLE FILTER FOR MODULATING LASER INTENSITY AND REDUCING LASER FEEDBACK IN AN OPTICAL DISK DEVICE

[75] Inventors: Blair I. Finkelstein; William C. Williams, both of Tucson, Ariz.

[73] Assignee: International Business Machines Corporation, Armonk, N.Y.

[21] Appl. No.: 976,436

[22] Filed: Nov. 13, 1992

[51] Int. Cl.$^6$ .................................................. G11B 7/00
[52] U.S. Cl. ........................ 369/112; 369/121; 369/110
[58] Field of Search .................................. 369/121, 122, 369/44.11, 44.23, 44.24, 110, 109, 112, 116, 126, 275.2; 359/36, 37, 39, 42, 55, 58, 63, 66, 91; 355/251, 252

[56] References Cited

U.S. PATENT DOCUMENTS

| | | | |
|---|---|---|---|
| 3,644,016 | 2/1972 | Macken | 359/250 |
| 3,696,344 | 10/1972 | Feinleib et al. | 369/275.2 |
| 3,807,830 | 4/1974 | Luke et al. | 359/251 |
| 4,114,180 | 9/1978 | Kayanuma | 369/116 |
| 4,150,398 | 4/1979 | Kojima et al. | 369/116 |
| 4,337,535 | 6/1982 | Van Megen et al. | 369/121 |
| 4,367,924 | 1/1983 | Clark et al. | 359/36 |
| 4,444,469 | 4/1984 | Kaye | 359/63 |
| 4,491,941 | 1/1985 | Kinjo et al. | 369/126 |
| 4,563,059 | 1/1986 | Clark et al. | 359/36 |
| 4,790,634 | 12/1988 | Miller et al. | 359/71 |
| 4,835,761 | 5/1989 | Shikama et al. | 369/122 |
| 4,838,663 | 6/1989 | Lagerwall et al. | 359/36 |
| 4,941,139 | 7/1990 | Kulakawski et al. | 369/116 |
| 4,991,160 | 1/1991 | Premji | 369/112 |
| 5,032,002 | 7/1991 | Fonneland et al. | 359/26 |
| 5,042,020 | 8/1991 | Endo | 369/116 |
| 5,049,462 | 9/1991 | Funhoff et al. | 369/110 |
| 5,084,856 | 1/1992 | Henmi et al. | 369/116 |
| 5,161,133 | 11/1992 | Levenson | 369/112 |
| 5,214,633 | 5/1993 | Tanno et al. | 369/116 |
| 5,218,610 | 6/1993 | Dixon | 372/20 |
| 5,226,029 | 7/1993 | Takanashi et al. | 369/13 |
| 5,231,521 | 7/1993 | Johnson et al. | 359/53 |
| 5,235,437 | 8/1993 | Katagiri et al. | 359/252 |

OTHER PUBLICATIONS

Maeda et al. (1990) "Electronically Tunable Liquid–Crystal–Etalon Filter for High–Density WDM Systems" IEEE Photonics Tech. Letts. 2(11):820–822.

Tien and Ulrich (1970) "Theory of Prism–Film Coupler and Thin–Film Light Guides" J. Opt. Soc. Am. 60(10):1325–1337.

Liu et al. (1991) "Measurement of High Frequency Electro–Optic Coefficient in Ferroelectric Liquid Crystal Materials" Technical Digest 15:226–229.

Garoff and Meyer (1977) "Electroclinic Effect at the A–C Phase Change in a Chiral Smectic Liquid Crystal" Physical Review Letts. 38(15):848–851.

*Primary Examiner*—Nabil Z. Hindi
*Attorney, Agent, or Firm*—Charles E. Rohrer; Alison A. Langford

[57] ABSTRACT

This invention provides an optical disk device with a switchable filter for reducing the light intensity from a write level to a read level or an erase level. The filter can further be used to modulate the light intensity between a write level and a gap level for the process of recording data. For semiconductor laser sources, this filter reduces laser feedback noise by allowing the laser to operate at a higher, more stable power level during data sensing, and by reducing the amount of light reflected from the storage disk back to the laser cavity. Because the filter transmission can be high during the write process, the power requirements of the semiconductor laser are not increased in the device of this invention. In one embodiment, the switchable filter of this invention includes a variable retarder with means to select light on the basis of its phase or polarization, for example, with polarizers. This retarder can comprise a liquid crystal cell wherein either the optical orientation or retardance is electro-optically tunable.

23 Claims, 2 Drawing Sheets

5,606,541

SWITCHABLE FILTER FOR MODULATING LASER INTENSITY AND REDUCING LASER FEEDBACK IN AN OPTICAL DISK DEVICE

FIELD OF THE INVENTION

This invention pertains to a switchable filter for light intensity modulation within an optical data storage device.

BACKGROUND OF THE INVENTION

Optical disk devices utilize laser light for recording data onto and sensing data from storage media. To write data on optical media, the laser is operated at a relatively high, rapidly switchable power level in order that the medium can be altered in accordance with the input data stream. In reading the data back, the laser power level is controlled at a lower level so that the medium is not altered by the laser beam, but the reflected light indicates the presence or absence of medium alterations caused by the input data stream. In erasing data, the light source operates continuously at a power level lower than the write level. In a typical optical disk device, the laser power at the disk is modulated between a high and a low level for data recording, typically 15–20 mW and 0.5 mW, and is 2 mW for reading and 8 mW for erasing.

Semiconductor diode lasers are presently the light source of preference in optical disk systems. They are lightweight, efficient in electrical-to-optical power conversion, and can be amplitude-modulated by control of the injection current. Because of losses in beam collimating, circularizing, and focussing elements, the path efficiency for coupling the generated light to the disk is about 50%. Thus the power requirements of the light source-are twice those required at the disk, and 50 mW diode lasers are typically employed.

The stability of the laser emission is a major factor in determining the signal-to-noise of data retrieval. Diode lasers are subject to mode hops between Fabry-Perot cavity resonances, particularly when operated continuous wave (CW) at low power as in the data reading process. Light reflected from the optical disk directly back to the laser exacerbates the instability. In systems where data is retrieved by intensity contrasts or phase shifts, polarizing beamsplitters and quarter-wave plates can be positioned in the beam path to minimize the return of reflected light to the laser. However, in magneto-optic (MO) systems feedback cannot be eliminated with passive optical components because the signal is detected as elliptical polarization produced at the disk surface by Kerr rotation of incident, linearly-polarized, light. Moreover, feedback noise is particularly serious in MO systems because of the limited signal level available.

Several methods have been proposed to reduce laser feedback. High frequency modulation of the laser can be used to reduce the noise, but at the cost of increased electronic circuitry, radio frequency interference, and laser power transients. Placing a beam attenuator, such as a filter or polarizer, with transmittance T in the optical path between the laser source and the optical disk attenuates $1-T^2$ of the reflected beam which returns to the laser cavity (U.S. Pat. No. 4,337,535 and U.S. Pat. No. 4,835,761). However, it also attenuates $1-T$ of the beam which reaches the disk and the generated laser power must be correspondingly increased.

SUMMARY OF THE INVENTION

This invention provides an optical disk device with a coherent light source, an optical storage medium, and a switchable filter for reducing the light intensity from a write level to a read level or an erase level. The filter can further be used to modulate the light intensity between a high and a low level for the process of recording data. For semiconductor laser sources, this filter reduces laser feedback noise by allowing the laser to operate at a higher, more stable power level during data sensing, and by reducing the amount of light reflected from the storage disk back to the laser cavity. Because the filter transmission can be high during the write process, the power requirements of the semiconductor laser are not increased in the device of this invention.

In one embodiment, the switchable filter of this invention includes a variable retarder with means to select light on the basis of its phase or polarization, for example, with polarizers. This retarder can comprise a liquid crystal cell wherein either the optical orientation or retardance is electro-optically tunable.

DETAILED DESCRIPTION OF THE INVENTION

Figure 1:
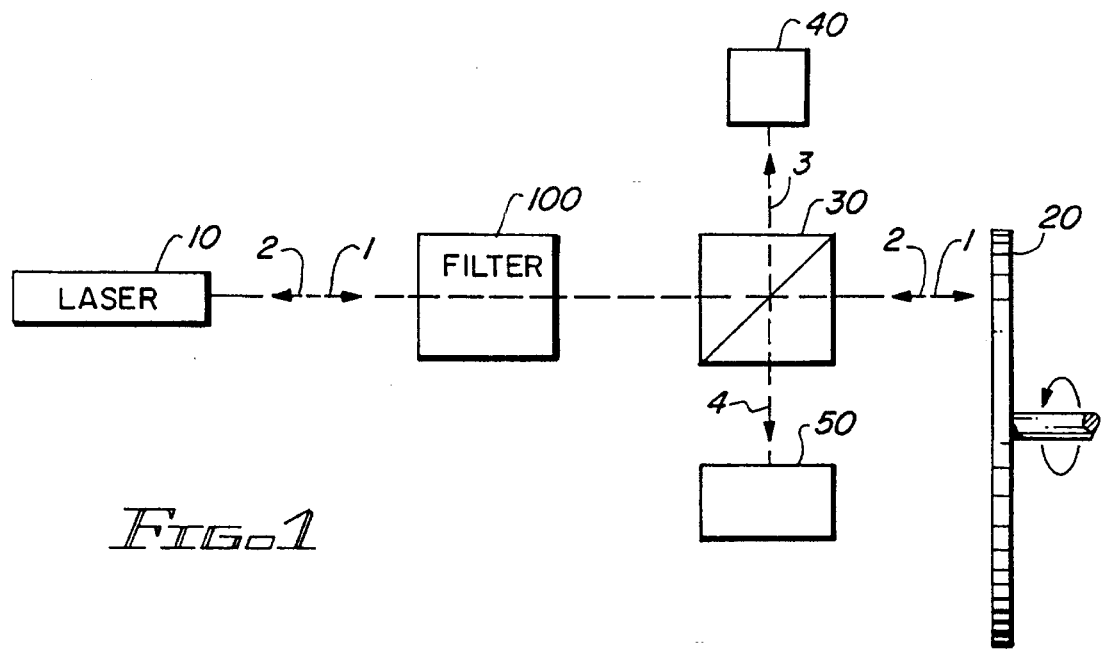
FIG. 1 is an optical data storage device with a switchable filter.

Referring now to the drawings, like numbers indicate like features and a reference number appearing in more than one figure refers to the same element.

FIG. 1 is an embodiment of the optical data storage device of the present invention. Laser be generates light which is coupled to optical disk 20 along optical path 1. Beamsplitter 30 couples a portion of the generated beam to power detector 40 along optical path 3. Light is reflected by the optical disk and is coupled by the beamsplitter to data, focus, and tracking detectors 50 along optical path 4, or returns to the laser source along optical path 2. Switchable filter 100 provides variable optical attenuation and is located in optical paths 1 and 2.

Filter 100 is any means for providing variable optical attenuation. It can be switched to provide different attenuations, for example, by mechanical, thermal, electrical, or optical means. Suitable filters include, but are not limited to, bleachable neutral density filters, electrochromic filters, and birefringent filters.

The switchable filter can be used to transmit suitable power levels for the various functions of the optical disk device, with attenuation increasing according to the order of decreasing power requirements for the functions of recording, erasing, and reading data. In this capacity, the attenuation can be minimized for writing so that the power requirements of the laser source are not increased. The preferred response time for this embodiment of the filter of this invention is less than 1 msec.

The filter can further be used to modulate the laser intensity at the disk for the purpose of recording an input data stream. At least two power levels are utilized in this process, a relatively high power which alters the record medium for writing, and a relatively lower power for the gaps. The gap power need only provide sufficient reflected intensity along optical path 4 to maintain the beam tracking on the disk. The preferred response time of the filter in this embodiment is less than 20 nsec. By transferring the entire power modulation function from the laser to the switchable filter, this invention enables the use of laser sources other than the diode lasers of the current technology.

A further function of the switchable filter of this invention is to provide increased laser stability and reduced feedback of reflected light into the laser cavity. The stability of semiconductor diode lasers decreases at the low laser power required for data retrieval. In this invention, the laser can continue to operate at a more stable higher power and the switchable filter can attenuate the beam which impinges on the optical disk to a suitable level for data reading. In contrast to a passive filter, the transmission can be switched to a maximum during data recording and the power requirements of the laser are therefore not increased. The filter, with transmittance T, also functions to attenuate $1-T^2$ of the laser feedback, a main contributor to cavity instability. When T=0.5, the feedback is reduced to 25% of the unfiltered level. When T=0.1, as can be used to reduce power at the disk from 20 mW for writing to 2 mW for reading, the feedback is only 1% of the unfiltered level, thus greatly increasing the S/N ratio for the reading operation.

Figure 2A:
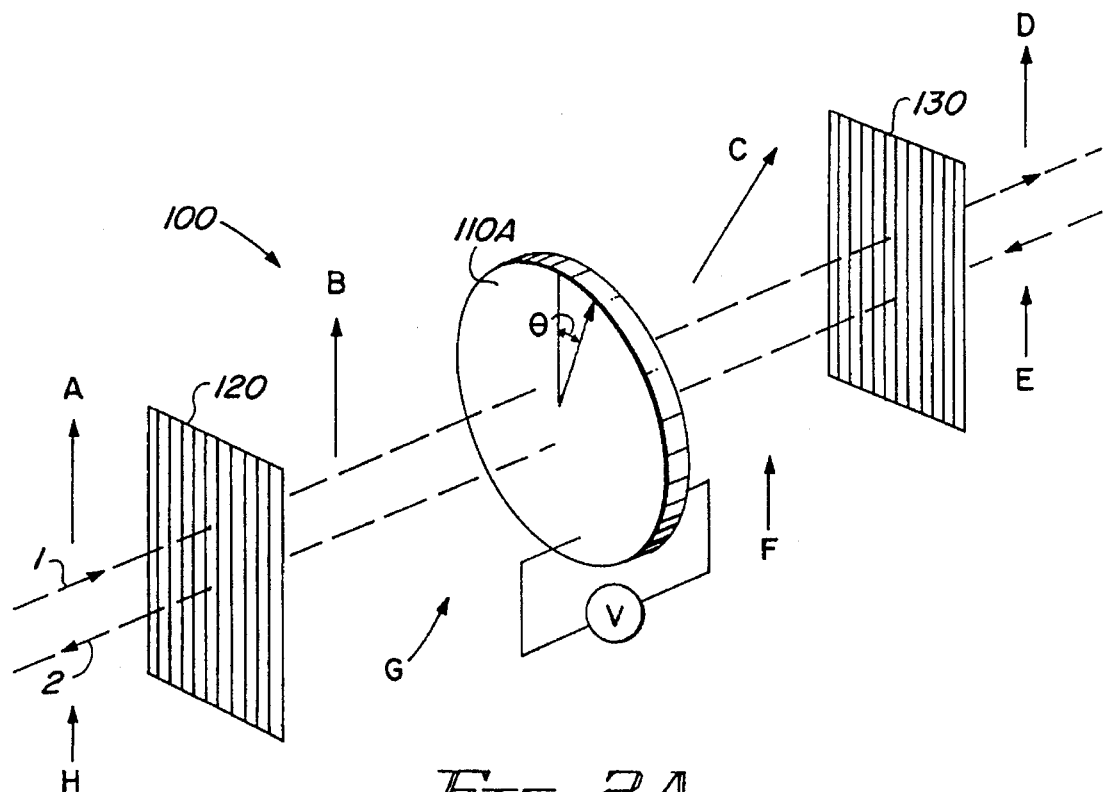
FIG. 2 is a switchable filter comprising polarizing means retarder with variable orientation (FIG. 2A) or variable retardance (FIG. 2B).

One embodiment of filter 100 employs an electro-optically tunable birefringent element to change the polarization or the phase of the light within the filter, and further includes means for selecting light on the basis of polarization or phase. FIG. 2A illustrates an embodiment of switchable filter 100 which comprises rotatable retarder 110A which, in this example, is a half-wave retarder at the laser wavelength. The orientation of the optic axis of the retarder is a function of applied voltage. Polarizing means 120 and 130 are positioned on either side of the retarder. The source beam travels on optical path 1 and the reflected beam on path 2.

For illustration, the magnitude and orientation of the electric field of the laser light is indicated after each element with arrows labeled A-H. In this embodiment, polarizer 120 is parallel to the polarization of the source beam, of intensity $I_o$, and beam A is transmitted without change. Half-wave retarder 110A rotates the polarization of beam B by 180° about its optic axis. The optic axis is oriented at $\Theta$ and transmitted beam C is oriented at $2\Theta$. When $\Theta=0$ the beam is unaltered. Polarizer 130 is parallel to polarizer 120 and it transmits the component of beam C with polarization parallel to its orientation. The amplitude of transmitted beam D is $I_o\cos2\Theta$. Reflected beam E is unaltered by polarizer 130 (beam F), is reflected through $\Theta$ by retarder 110A (beam G), and reduced in intensity to $I_o\cos^2 2\Theta$ by polarizer 120 (beam H). When rotatable retarder 110A is not a half-wave retarder, the filter function is similar but the polarization does not remain linear within the filter.

Figure 2B:
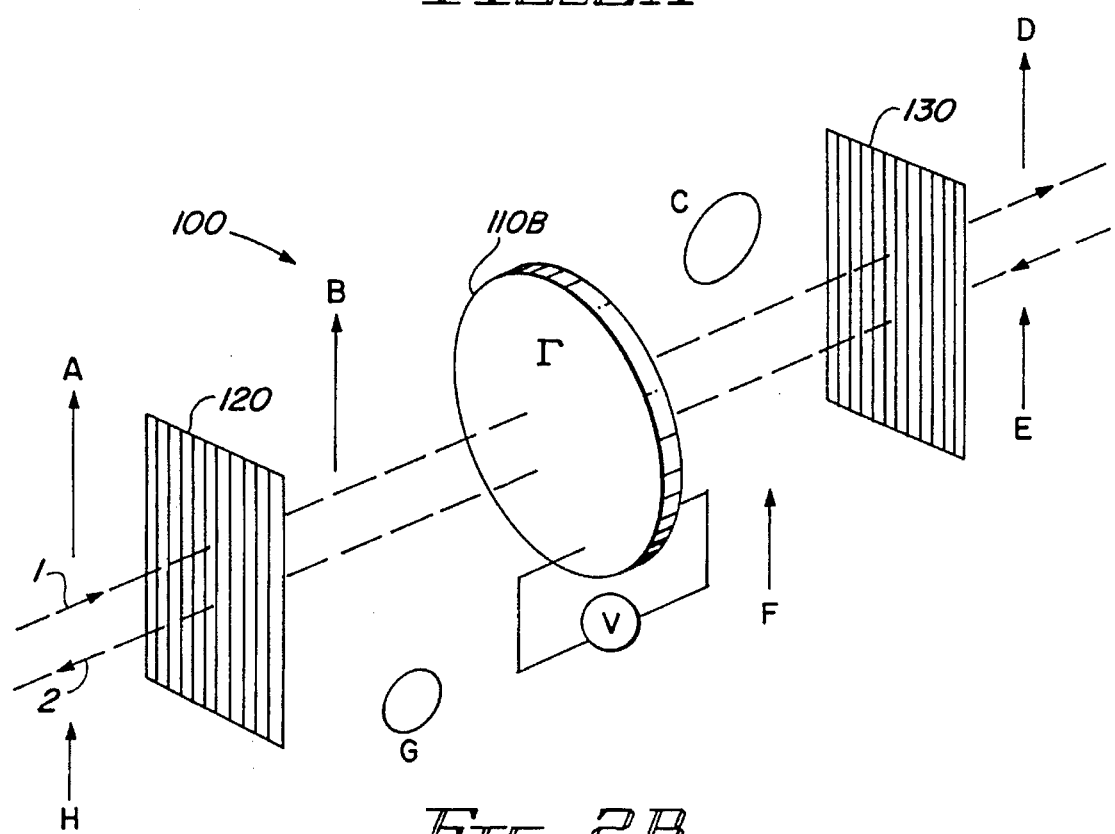

Rotatable retarder 110A can be replaced by variable retarder 110B, as shown in FIG. 2B. Application of an electric field to retarder 110B varies the magnitude, $\Gamma$, rather than the orientation of the retardance. In general, the polarization is rendered elliptical by the retarder (beams C and G), and polarizers 120 and 130 transmit the linear component parallel to the orientation of the polarizer (beams D and H). When $\Gamma$ is a multiple of a full-wave retarder for the laser wavelength, the light is completely transmitted.

In the embodiments of FIGS. 2A and 2B, the orientations of the polarizers can be altered. When polarizer 120 is not parallel to the source polarization, there is a base attenuation of the beam intensity in addition to the variable attenuation provided by filter 100. Polarizer 130 can have any orientation with respect to polarizer 120. Design parameters for the orientation and retardance of the elements in FIG. 2 to achieve desired attenuations are well known in the art.

Polarizing means 120 can be the cavity of laser 10, which will support only one polarization. Polarizing means 130 can be beamsplitter 30 in devices in which it is a polarizing beamsplitter. Alternatively, polarizing means 130 can be a sheet polarizer, in which case the component of light orthogonal to the direction of polarization is absorbed rather than reflected back towards the laser.

Figure 3:
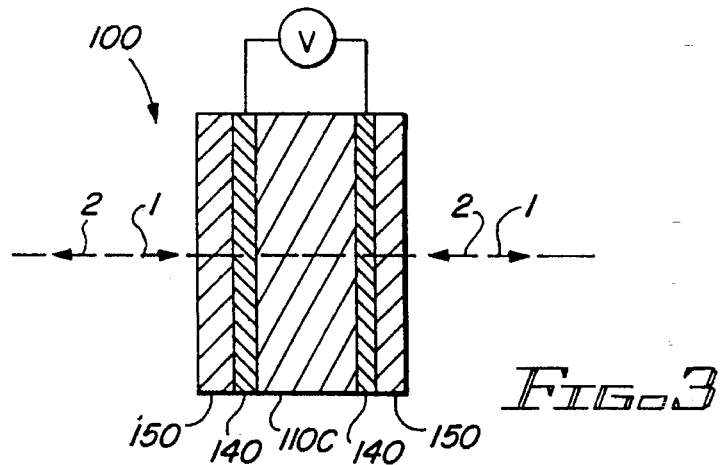
FIG. 3 is a switchable filter comprising a variable retarder within a Fabry-Perot cavity.

In the embodiment of FIG. 2, filter 100 utilizes polarizing means to select light on the basis of its phase or polarization. Other means for selection can be employed. For example, filter 100 can comprise a Fabry-Perot cavity containing a variable retarder, illustrated in FIG. 3. Reflective surfaces 150 form a multi-pass cavity which contains variable retarder 110C. A voltage is applied to semitransparent electrodes 140 to tune the retardance. Depending on the birefringent material in retarder 110C, the electrodes can be positioned as illustrated or they can be placed laterally. Tuning retarder 110C changes the cavity resonance condition and thereby varies the transmittance of the filter (Maeda et al., IEEE Phot. Tech. Lett. 2, 820, 1990).

Figure 4:
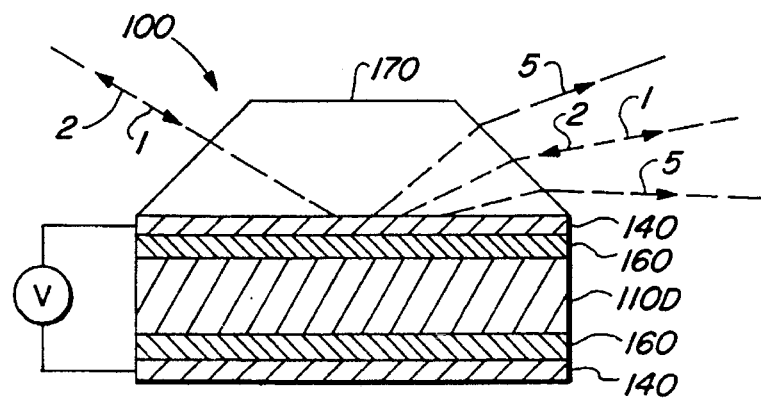
FIG. 4 is a switchable filter comprising a variable retarder within a prism-coupled waveguide.

Filter 100 can also comprise a prism-coupled waveguide, illustrated in FIG. 4. Cladding layers 160 provide waveguiding within variable retarder 110D. As in the Fabry-Perot filter, a voltage is applied on electrodes 140, which can alternatively be placed laterally. Prism 170 couples light into and out of the waveguide along paths 1 and 2 when the retardance of retarder 110D satisfies the coupling condition. Tuning variable retarder 110D changes the prism-coupling condition and thereby varies the transmittance of the filter (Tien and Ulrich, J. Opt. Soc. Am. 60, 1325, 1970 and Liu et al., in *Technical Digest on Nonlinear Guided-Wave Phenomena* 1991 (Opt. Soc. Am., Washington, 1991), vol. 15, p. 226). The filter can utilize a higher order waveguide wherein more than one mode is propagated. Each mode is coupled out at a different angle to produce multiple beams 5. This can be utilized for multichannel optical disk operation.

Retarders 110A and 110B can contain any of the optoelectronic materials known in the art. Because of their high throughput and low voltage requirements, liquid crystal materials are particularly suited to this application. Nematic liquid crystals provide analog retardation changes with tuning speeds of 1–100 ms. Chiral smectic liquid crystals (CSLCs) in homeotropically aligned cells (smectic layers parallel to substrate walls) provide tunable retardation with tuning speeds as fast as 1 μs (Garoff et al., Phys. Rev. Lett. 38:848, 1977). These classes of liquid crystal materials can be used in variable retarder 110B. In a "bookshelf" geometry (smectic layers oriented perpendicular to the substrate walls) CSLC's provide a voltage dependent orientation of the optic axis. Depending on the CSLC material, the orientation can have two or more discrete stable states, for example using ferroelectric SmC* Or SmH* (N. A. Clark et al. in U.S. Pat. No. 4,367,924 and U.S. Pat. No. 4,563,059), or can be analog tuned, for example with SmA* (S. T. Lagerwall et al. in U.S. Pat. No. 4,838,663). These classes of materials can be used in rotatable retarder 110A. By utilizing the linear electro-optic effect (Pockels effect), liquid crystal cells in Fabry-Perot and waveguide structures may having switching speeds in the GHz range (Liu, supra).

This invention provides an optical data storage device with a switchable filter. The preceding embodiments are examples of this invention. Other embodiments and applications will be readily apparent to those skilled in the art.

We claim:

1. An optical data storage device adapted for use with an optical record storage medium with addressable data storage locations capable of reflecting light, said storage device comprising:

a semiconductor laser, optically coupled with the storage medium; and a switchable filter, positioned between said semiconductor laser and said storage medium;

wherein said semiconductor laser is adapted for operation at an approximately constant output power and wherein the stability of said semiconductor laser increases with laser power and wherein said constant output power is sufficient for recording data onto said storage medium and wherein said constant output power is used for both recording and sensing data, thereby providing increased semiconductor laser stability during data sensing;

wherein the transmittance of said filter is modulated between a first, high, level and a second, low, level of transmittance for recording data onto said storage medium, said high transmittance level for writing by altering said medium and said low transmittance level for gaps; and wherein the transmittance of said filter is switched to a third level for sensing data from said storage medium, said third level being less than said first level, thereby reducing the feedback of light reflected from said storage medium to said semiconductor laser.

2. The storage device of claim 1 wherein the transmittance of said filter is switched to a fourth level used for erasing data from said storage medium.

3. The storage device of claim 1 wherein the switching time for said filter is less than about 1 ms.

4. The storage device of claim 1 wherein the switching time for said filter is less than about 20 ns.

5. The storage device of claim 1 further including a beamsplitter, positioned between said filter and said optical record storage device, for coupling a portion of light reflected from said medium to data, focus, or tracking detectors.

6. The storage device of claim 1 wherein said filter is electro-optically switchable.

7. The storage device of claim 1 wherein said filter includes a variable or rotatable retarder.

8. The storage device of claim 7 wherein said filter further includes selection means, optically coupled with said retarder, for preferentially transmitting light of a particular polarization or phase.

9. The storage device of claim 8 wherein said selection means comprises a polarizer.

10. The storage device of claim 8 wherein said selection means comprises a first polarizer positioned on a first side of said retarder and a second polarizer positioned on a second side of said retarder.

11. The storage device of claim 10 wherein only one polarization of light is propagated by the laser cavity Of said semiconductor laser, and wherein said first polarizer comprises said laser cavity.

12. The storage device of claim 11 wherein said second polarizer comprises a thin film polarizer and where said retarder is a liquid crystal rotatable retarder.

13. The storage device of claim 10 wherein said first and second polarizers are oriented with axes of polarization parallel or perpendicular to each other.

14. The storage device of claim 7 wherein said retarder is a liquid crystal retarder.

15. The storage device of claim 14 wherein said liquid crystal retarder is a nematic liquid crystal retarder.

16. The storage device of claim 14 wherein said liquid crystal retarder is a chiral smectic liquid crystal retarder.

17. The storage device of claim 16 wherein said chiral smectic liquid crystal retarder is planar aligned.

18. The storage device of claim 17 wherein said chiral smectic liquid crystal is homeotropically aligned.

19. The storage device of claim 17 wherein said liquid crystal retarder utilizes the linear electro-optic effect.

20. The storage device of claim 17 wherein said liquid crystal retarder is a discrete stable state retarder.

21. The storage device of claim 1 wherein the stability of said semiconductor laser is a function of the amount of returning light reflected from said storage medium, and wherein said switchable filter reduces the intensity of said returning light to an amount corresponding with an acceptable noise level.

22. The storage device of claim 1 further including a modulator, operatively connected to said switchable filter, to switch the transmittance of said filter between said first and second levels.

23. A method of reducing laser feedback in an optical data storage device, said storage device adapted for use with an optical record storage medium with addressable data storage locations capable of reflecting light, said storage device comprising a semiconductor laser optically coupled with said storage medium and further comprising a switchable filter positioned between said semiconductor laser and said storage medium, said method comprising the steps of:

operating said semiconductor laser at an approximately constant output power, said output power sufficient for recording data onto said storage medium and wherein said constant output power is used for both recording and sensing data, thereby providing increased semiconductor laser stability during data sensing;

switching the transmittance of said switchable filter between a first, high, level and a second, low, level for recording data onto said storage medium, said high level for writing by altering said storage medium and said low level for gaps; and switching the transmittance of said switchable filter to a third level for sensing data from said storage medium, said third level being less than said first level, thereby reducing the feedback of light reflected from said storage medium to said semiconductor laser.

* * * * *

UNITED STATES PATENT AND TRADEMARK OFFICE
CERTIFICATE OF CORRECTION

PATENT NO. : 5,606,541
DATED : February 25, 1997
INVENTOR(S) : Finkelstein et al.

It is certified that error appears in the above-indentified patent and that said Letters Patent is hereby corrected as shown below:

Col. 2, line 37:  change "be" to --10--
Col. 6, line 17:  change "17" to --16--
        line 19:  change "17" to --16--
        line 21:  change "17" to --16--

Signed and Sealed this

Twenty-third Day of December, 1997

Attest:

BRUCE LEHMAN

*Attesting Officer*     *Commissioner of Patents and Trademarks*